United States Patent [19]
Huddleston

[11] 3,768,176
[45] Oct. 30, 1973

[54] GAME FOR IMPROVING COMMUNICATION SKILLS

[76] Inventor: Thomas J. Huddleston, 915 Crestland Dr., Ballwin, Mo. 63011

[22] Filed: Feb. 2, 1972

[21] Appl. No.: 222,875

[52] U.S. Cl. .............................. 35/22 R, 273/1 R
[51] Int. Cl. .......................................... G09b 19/00
[58] Field of Search ....................... 35/22 R, 22 A; 273/1 R

[56] References Cited
UNITED STATES PATENTS

| | | | |
|---|---|---|---|
| 3,458,189 | 7/1969 | Holt | 273/1 R |
| 2,659,163 | 11/1953 | Albee | 35/22 A UX |
| 3,600,826 | 8/1971 | Thomas | 35/22 R |

Primary Examiner—Wm. H. Grieb
Attorney—John M. Howell

[57] ABSTRACT

A game for testing and improving the communication skills of its participants comprising a set of blocks for each participant, each set of blocks being identical and each having a plurality of blocks therein, each block within a set having identifiable parameters, and each being adaptable for assembly with the other blocks in its set in a variety of ways. One of the participants is selected to communicate a structure made from his blocks to the other participant (s) who in turn is/are required to duplicate the communicated structure. Means are provided for blocking visual contact of the selected participant's blocks by the other participant(s).

11 Claims, 3 Drawing Figures

PATENTED OCT 30 1973    3,768,176

GAME FOR IMPROVING COMMUNICATION SKILLS

SUMMARY OF THE INVENTION

This invention relates to a game and more particularly to one for testing and improving the communication skills of the participants. The game includes a plurality of sets of blocks, one for each participant, each set being identical. Within each set are a plurality of blocks each having distinct parameters. A selected one of the participants must communicate a particular structure built from his set of blocks to the other participant(s) who must in turn duplicate that structure from the selected participant's instructions. The selected participant may either describe a prearranged structure, or describe one as he builds it. A partition prevents visual contact of the selected participant's structure by the other(s) so that he/they must rely exclusively on some form of communications by or with the selected participant to duplicate the structure.

The parameters by which each of the blocks may be identified can be geometric shape, color, visual designs, weight, texture, odor, or the like or any combination of these, so that the game can be designed with any degree of complexity to suit the age, intellect, emotions, and social and psychological makeup of the individuals participating. Also, the game can be played with many variations while maintaining the basic objectives of this invention. For example, the other participant(s) may be allowed to reply, the participants may be allowed visual contact with each other, the communications may be oral, in writing, or in some other form such as hand signals, and so on.

The flexibility of this invention makes it adaptable for almost limitless use in testing and improving communication skills which is its primary object, while at the same time making the learning enjoyable.

DETAILED DESCRIPTION OF A PREFERRED EMBODIMENT

Figures 1, 2, 3:
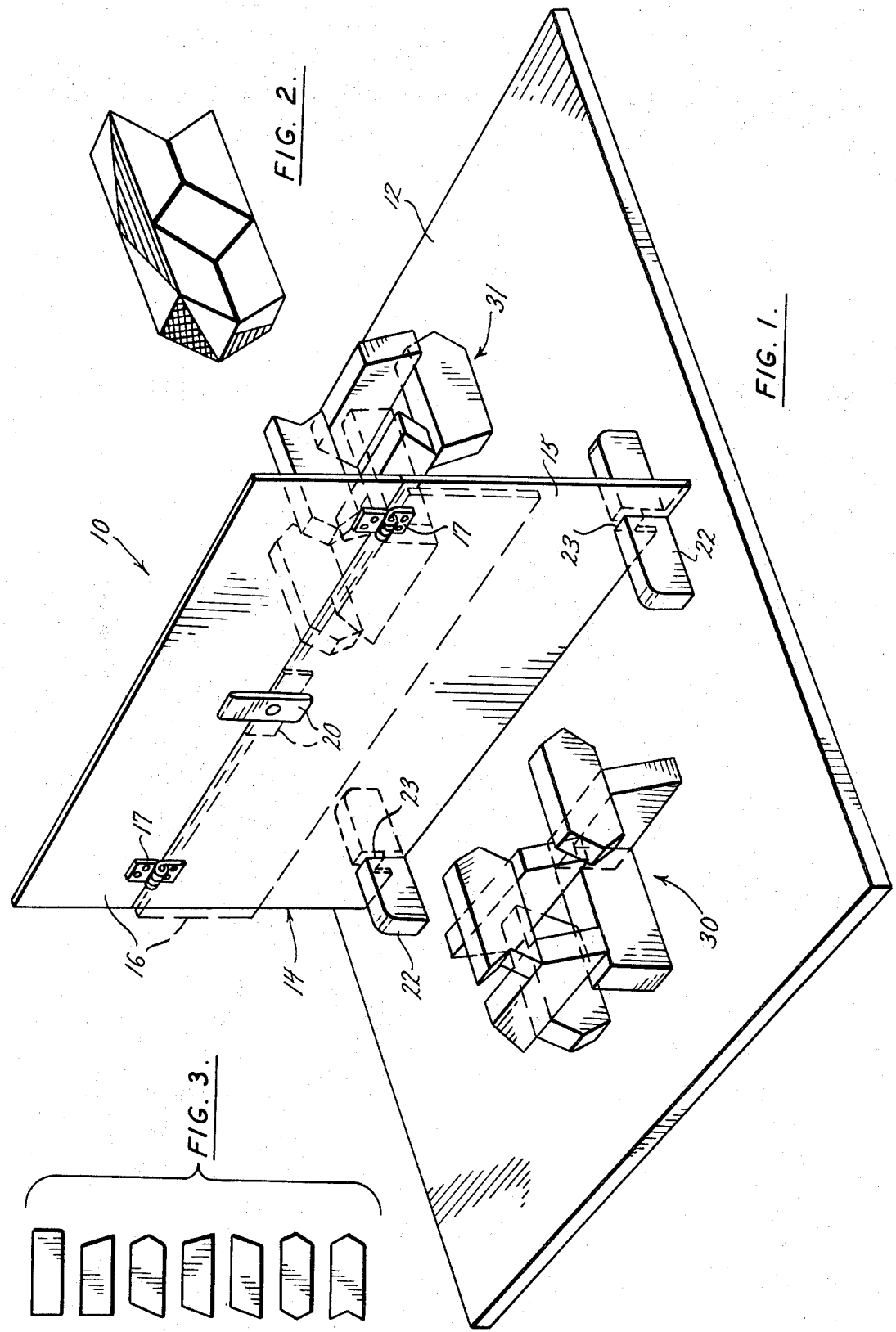
FIG. 1 is an isometric view of the communication game of this invention showing an example of a block structure communicated by the participants.
FIG. 2 is an isometric view of a typical block used with this invention illustrating the type of parameters for identifying a block.
FIG. 3 shows the side view of several blocks illustrating typical geometric shapes.

In the drawing there is shown a communications game 10 of this invention including a playing surface 12 of any suitable type such as table or floor and a vertical partition 14 having a bottom section 15 and a top section 16. Suitable hinges 17 provide folding of the top section 16 between the upright position shown by solid lines and the down position shown by dashed lines. The upper portion 16 is held in the upright position by a suitable latch 20. The partition 14 is held upright by stand members 22 having slots 23 extending partially therethrough for receiving the bottom edge of the partition which is notched at the locations of the slots to allow it to rest flush against the playing surface 12.

The partition can be made of any suitable material such as wood or even heavy cardboard, and can be easily disassembled for transporting and storage.

In this embodiment there are shown two sets of blocks 30 and 31, although more than two sets can be used as will be hereinafter explained. Each set contains a plurality of blocks, each block characterized by its geometric shape, color, weight, visual design, texture, odor, or any one or combination of these. This described embodiment includes seven blocks in each set although fewer or greater numbers can be used.

FIG. 3 shows the seven blocks in each set of this described embodiment as viewed from the side, but it is to be understood that these geometric shapes are merely illustrative of the kinds of shapes that can be used, the selection of shapes being limitless.

FIG. 2 is an isometric view of a typical block of this invention showing its unique geometric shape and characterized as having a variety of visual designs on selected ones of its surfaces. In this described embodiment each of the seven blocks in a particular set, such as for example set 30, is distinct in geometric shape and visual designs although duplicate blocks within a set can be used. The only requirement is that the sets of blocks be identical so that each participant has an identical set.

The object of the game is for one participant to communicate to the other participant or participants, as the case may be, the exact structure formed from his blocks, and for the other participant(s) to duplicate that structure from the communications and without seeing the one participant's structure. From this basic object the game can be played in various ways, a few of which are as follows:

EXAMPLE 1

The one participant begins building a structure from his set of blocks. As he builds, he communicates orally to the other participant(s) how to assemble the same structure. During this activity, the one participant does all of the talking, the other participant(s) not being allowed to communicate and there being no visual contact between the participants. With this variation of the game the upper portion 16 of the partition 14 is placed in its upright position to prevent the participants from seeing each other. Of course in none of these variations is/are the other participant(s) allowed to see the other's structure.

EXAMPLE 2

This variation is the same as in Example 1 except that the other participant(s) is/are allowed to respond orally to the instructions given by the one participant. Again visual contact between the participants is not allowed.

EXAMPLE 3

This variation is the same as in Example 1 except the participants are allowed visual contact with each other. Here the upper portion 16 would be placed in its down position.

EXAMPLE 4

This variation is the same as in Example 2 except that the participants are allowed visual contact with each other.

Further variations include using forms of communication other than oral such as written notes, hand signals, codes, color signals, or musical sounds and the like. For example, one or more of the visual designs on the blocks could be musical notes which the one participant must communicate by sounding the note and the other participant(s) so identify. Also, instead of the one participant building a structure as he plays, the game could be played by giving him a prearranged design which he must communicate to the other(s).

As can be seen, the variations are limitless. The particular parameters used in identifying the blocks depend on the intellectual, emotional, social, and psychological makeup of the individuals participating, so that the game can be made of a complexity suitable for participants of any age ranging from preschool-age children to adults.

Hence, the game of this invention provides an enjoyable means by which participants may test and improve their communication skills.

Various changes and modifications may be made in this invention, as will be readily apparent to those skilled in the art. Such changes and modifications are within the scope and teaching of this invention as defined by the claims appended hereto.

I claim:

1. A game for testing and improving the communication skills of its participants comprising a set of blocks for each participant, each set of blocks being identical and each having a plurality of blocks therein, each block within a set having identifiable parameters, and each block being geometrically shaped as to be capable of assembly with the other blocks in its set in a variety of ways to build a variety of structures, and means preventing visual contact of a selected participant's blocks by the other participant (s).

2. The game of claim 1 wherein at least one of the parameters of some of the blocks is geometric shape.

3. The game of claim 1 wherein at least one of the parameters of some of the blocks is weight.

4. The game of claim 1 wherein at least one of the parameters of some of the blocks is visual design.

5. The game of claim 1 wherein at least one of the parameters of some of the blocks is color.

6. The game of claim 1 including a partition means between the participants, the partition means being selectively adaptable for blocking visual contact between the participants.

7. The game of claim 1 including a partition means between the selected participant and the other(s), the partition means being selectively adaptable to one configuration for blocking visual contact between the selected participant and the other(s), and to another configuration for allowing visual contact between the selected participant and the other(s) but blocking visual contact of the selected participant's blocks by the other(s).

8. A method of testing and improving the communication skills of participants comprising the steps of providing a set of blocks to each participant, each set of blocks being identical and each having a plurality of blocks therein, each block within a set having identifiable parameters, and each block being geometrically shaped as to be capable of assembly with the other blocks in its set in a variety of ways to build a variety of structures, selecting one participant to communicate to the other a structure made from his blocks, selecting at least one other participant to duplicate the structure communicated by the selected participant, and blocking visual contact of the selected participant's blocks by the other participant.

9. The method of claim 8 wherein the other participant is allowed to reply to the communications of the selected participant.

10. The method of claim 8 wherein visual contact between the selected participant and the other participant is prohibited.

11. The method of claim 8 wherein visual contact between the selected participant and the other participant is allowed.

* * * * *